C. H. FARLEY.
DEVICE FOR HANDLING SHEETS OF GLASS.
APPLICATION FILED JAN. 28, 1910.
980,084.
Patented Dec. 27, 1910.
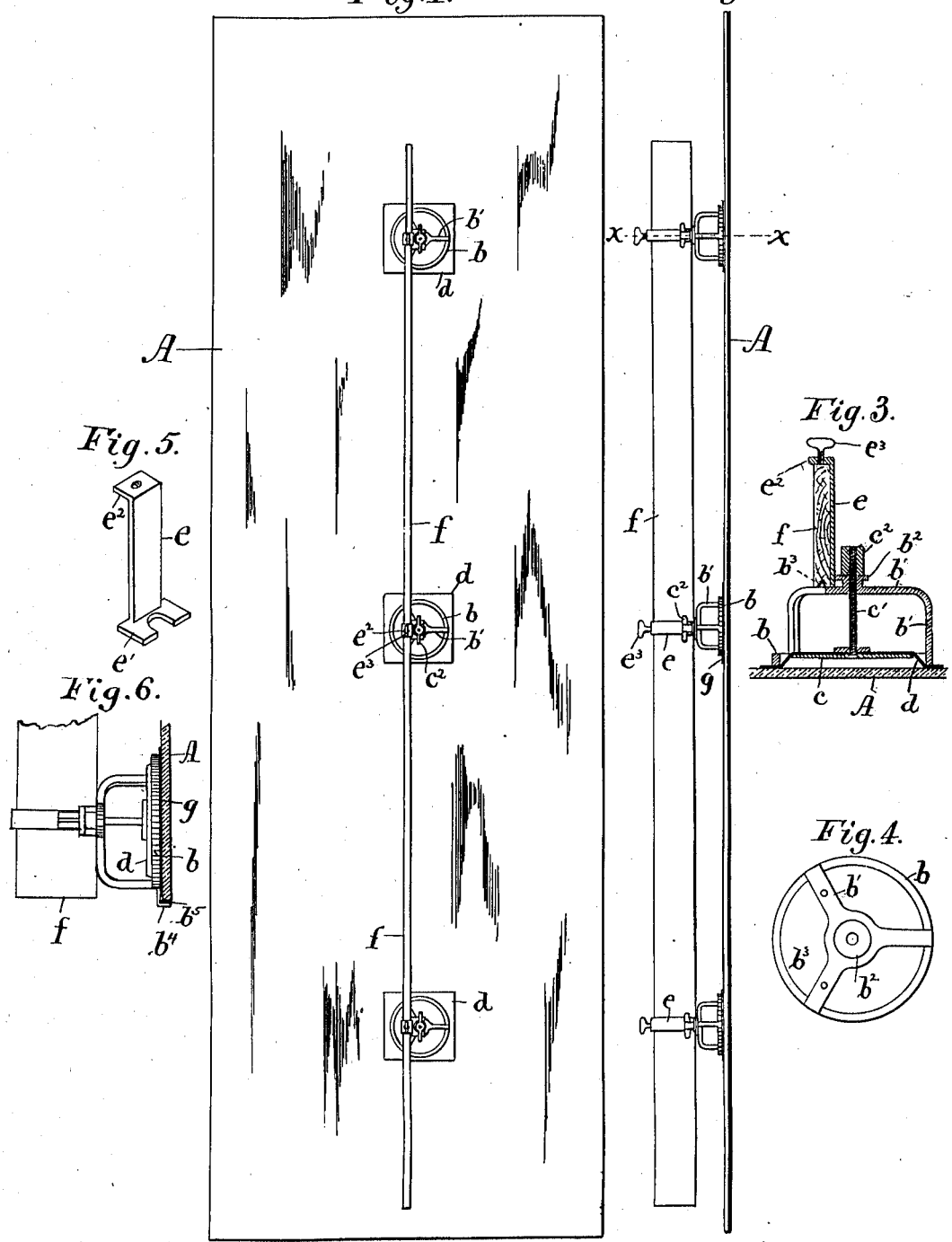

UNITED STATES PATENT OFFICE.

CYRUS H. FARLEY, OF PORTLAND, MAINE.

DEVICE FOR HANDLING SHEETS OF GLASS.

980,084.   Specification of Letters Patent.   Patented Dec. 27, 1910.

Application filed January 28, 1910. Serial No. 540,562.

*To all whom it may concern:*

Be it known that I, CYRUS H. FARLEY, a citizen of the United States of America, and a resident of Portland, in the county of Cumberland, State of Maine, have invented certain new and useful Improvements in Devices for Handling Sheets of Glass, of which the following is a specification.

My invention relates to a device for handling sheets of glass either polished or unpolished and it is particularly designed for handling plate glass when the same is being handled or worked upon.

In setting plate glass, it often happens that the glass bends and breaks during the operation of setting. Serious accidents occasionally happen to workmen by the breaking of plate glass, and it is not unusual for men to be killed in this way. When a large plate rests on its edge without any means of steadying it except by being held at its edge, there is always liability of breakage and when the glass breaks the workmen are liable to get badly hurt.

The object of my invention is to construct a device for handling glass which may be attached firmly to the face of the plate and which will serve as a means of steadying when handling it and which will at the same time insure the glass against bending or breaking.

According to my invention, I attach to a rigid connecting bar a plurality of suction heads which attach themselves firmly by vacuum to the face of the glass and by their combined adhesion give the workmen a means of handling the glass without danger to the glass or to themselves.

I illustrate my invention by means of the accompanying drawing in which—

Figure 1 is a front elevation of a strip of plate glass with my handling device applied, Fig. 2 is a side or edge view of the same, Fig. 3 is an enlarged section through the line $x\ x$ of Fig. 2, Fig. 4 is a plan of the pressure ring and its spider, Fig. 5 is a detail of the clamp, and Fig. 6 is a side elevation showing means for taking the direct weight of the glass.

In the drawing, A represents a sheet of plate glass and $f$ is a rigid connecting bar to which is secured a plurality of suitably constructed suction heads by which the bar may be firmly fastened to the face of the glass.

The form of suction head which I prefer to use is herein shown and it consists of a pressure ring $b$ surrounding a disk $c$, the disk $c$ being under and the ring $b$ resting on a piece of flexible packing $d$ preferably sheet rubber whereby a tight joint is made between the lower surface of the ring and the surface of the glass. The ring is forced down onto the packing $d$ to hold it against the glass and the disk is at the same time lifted to produce a vacuum and create a suction. For this purpose, I provide the disk with an upward extending screw spindle $c'$, this spindle passing upward through a central opening in a spider $b'$ which connects the sides of the ring and rises to form a dome. Beneath this dome and between it and the surface of the packing is a free space into which the disk may be lifted to produce a vacuum. For the purpose of raising the disk to produce a vacuum, I provide a nut which engages the upper end of the screw and which being screwed down onto the spider, raises the disk and at the same time forces down the ring onto the packing.

Means are provided for clamping the connecting bar $f$ to the suction head and for this purpose I provide a clamping member $e$ consisting of an upright which fits against the flat side of the bar $f$ with a bifurcated foot piece $e'$ which embraces a hub on the spider and is held down by an annular flange $b^2$ on the hub. The bar $f$ is held down by a thumb screw $e^3$ which passes through a lateral projection $e^2$ on the upper end of the clamping member and impinges on the upper edge of the bar $f$. For the purpose of preventing the bar $f$ from slipping, I place spurs $b^3$ on the upper surface of the spider.

It will be seen that when the screw $e^3$ is turned down the foot piece $e'$ is drawn upward against the flange $b^2$ and the bar $f$ forced down onto the spurs so that it cannot slip and the clamp cannot become detached from the hub.

By releasing the screw the clamp may be removed from the bar $f$ and the suction head disconnected and it is evident that the heads may be attached at any suitable points on the bar.

Any number of bars may be used and any number of heads on each bar according to the size of the glass to be handled.

With my device applied to a sheet of plate glass, the latter is prevented from bending or buckling and the workmen are able to handle it without fear of injury.

If it is desired to lift the glass bodily and to absolutely prevent the suction heads from slipping along the surface, I provide a rest which is secured to one of the heads and which is adapted to be inserted under the lower edge of the glass. In Fig. 6 I show such a head in which a projection $b^4$ extends downward from the ring $b$ turning under the lower edge of the glass to sustain the weight thereof. A rubber cushion or buffer $b^5$ is inserted between the glass and the projection being suitably secured to the latter.

It is evident that forms of suction head other than here shown may be used and the dome may be made solid instead of being open in the form of a connecting spider as here shown.

The device may be used for handling sheets or plates of stone, iron or other substances as well as for glass.

I claim:—

1. A device for handling sheets of glass consisting of a plurality of suction heads, means carried by each of said heads for regulating the degree of suction independently of the other heads to attach the head to the face of the glass and a rigid connecting bar to which said suction heads are secured.

2. A device for handling sheets of glass consisting of a plurality of suction heads, means carried by each of said heads for regulating the degree of suction independently of the other heads to attach the head to the face of the glass, a clamp on each of said suction heads and a rigid bar connecting said heads and detachably secured thereto by said clamps.

3. A device for handling sheets of glass consisting of a sheet of flexible packing, a disk beneath said packing, a pressure ring surrounding said disk, and above said packing and having a connecting dome forming a free space above said disk, a screw spindle secured to said disk and extending upward through said dome, a nut engaging the upper end of said screw spindle above said dome, a clamping member secured to said dome and extending upward therefrom and having an offset flange at the upper end thereof, a clamping screw extending through said offset flange and a connecting bar adapted to be clamped between the dome and said offset flange.

4. A device for handling sheets of glass consisting of a sheet of flexible packing, a disk beneath said packing, a pressure ring surrounding said disk, and above said packing having a connecting dome to form a free space above the disk, a screw spindle secured to said disk and extending upward through said dome, a nut engaging the upper end of said screw spindle above said dome.

5. A device for handling sheets of glass consisting of a sheet of flexible packing, a disk beneath said packing, a pressure ring surrounding said disk and above said packing and having a connecting dome to form a free space above the disk, a screw spindle secured to the disk and extending upward through the dome, a nut on the upper end of the spindle, a connecting bar adapted to rest on the dome, a clamping member having a foot piece on its lower end and a laterally projecting offset on its upper end, a flange being formed on the top of said dome for engaging said foot piece, a binding screw extending through said offset and adapted to confine the connecting bar between the offset and the dome.

6. A device for handling sheets of glass consisting of a sheet of flexible packing, a disk beneath said packing, a pressure ring surrounding said disk and above said packing, a spider connecting the sides of said ring and elevated to form a free space above said disk, a screw spindle secured to said disk and extending upward through said spider, a nut on the upper end of said screw spindle, spurs on said spider, a connecting bar resting on said spurs and a detachable clamp on said spider for securing said connecting bar to the said spider.

7. A device for handling sheets of glass consisting of a series of suction heads, means carried by each of said heads for regulating the degree of suction independently of the other heads to attach the head to the face of the glass, a rigid connecting bar connecting said heads one of said heads being provided with a projection adapted to fit under the lower edge of the glass to sustain the weight thereof.

8. A device for handling sheets of glass consisting of a plurality of suction heads, manually operative means carried by each of said heads for creating suction independently of the other heads to attach the head to the face of the glass and a rigid connecting bar to which said suction heads are secured.

9. A device for handling sheet glass comprised of a plurality of suction heads independently regulable as to degree of suction and adapted to be secured by suction to a sheet of glass and clamps for said heads.

10. A device for handling sheet glass comprising a suction head having a packing ring, a diaphragm forming a vacuum chamber within the ring, means for withdrawing the diaphragm to produce a vacuum and for simultaneously pressing the ring against the glass, a handling bar and a clamp for securing the head to the handling bar.

In witness whereof I have hereunto set my hand this 19th day of January, 1910.

CYRUS H. FARLEY.

Witnesses:
S. W. BATES,
ELEANOR W. DENNIS.